Oct. 29, 1929.  J. LONDINO  1,733,546
WINDSHIELD CLEANER
Filed March 8, 1928
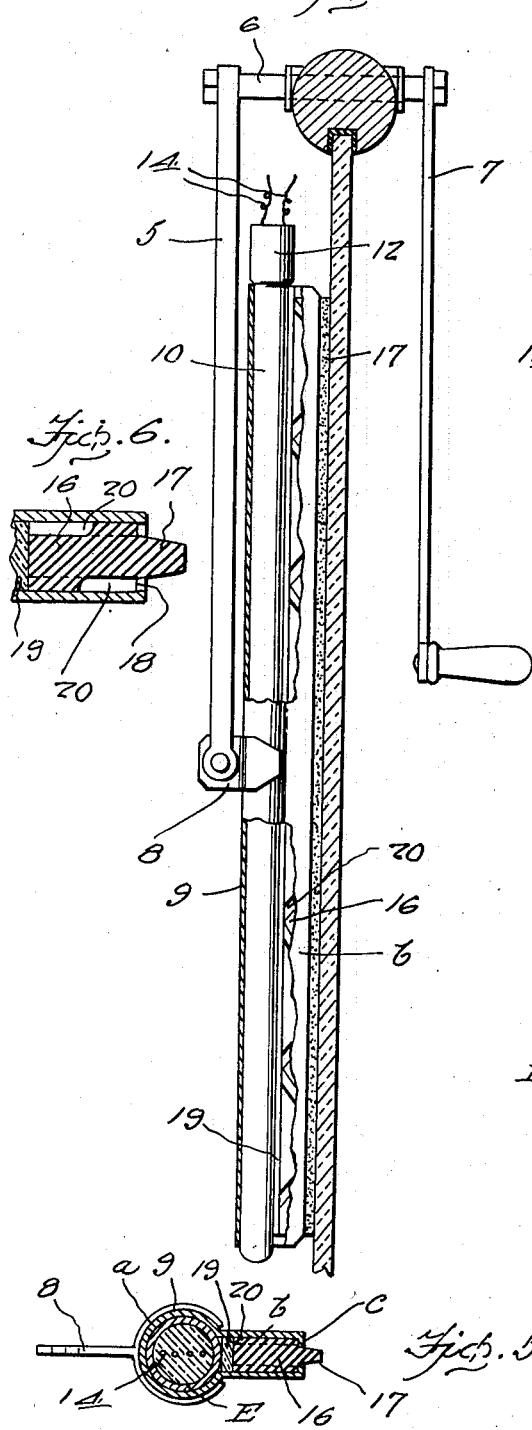
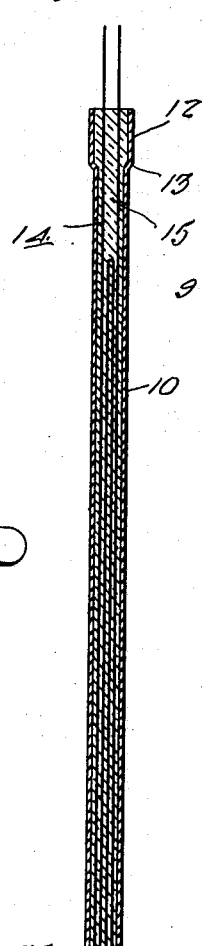
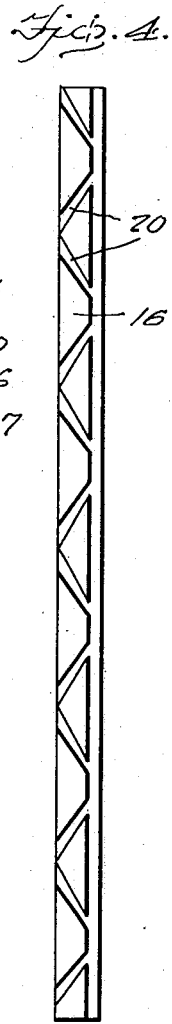
Inventor
Joseph Londino
By Clarence A. O'Brien
Attorney Patented Oct. 29, 1929

1,733,546

UNITED STATES PATENT OFFICE

JOSEPH LONDINO, OF ELIZABETH, NEW JERSEY, ASSIGNOR OF THIRTY-NINE PER CENT TO MINNIE LONDINO, TEN PER CENT TO JOSEPHINE M. GAMBIT, BOTH OF ELIZABETH, NEW JERSEY, AND FIFTY-ONE PER CENT TO E. A. McLARNEY, OF JAMAICA, NEW YORK

WINDSHIELD CLEANER

Application filed March 8, 1928. Serial No. 260,026.

The present invention appertains to an improvement in windshield cleaners, and an important object of the same is to provide an improved device of this character which is effective in removing dust and moisture whether the latter be in liquid or frozen form.

Another very important object of the invention resides in the provision of a windshield wiper of this nature which comprises a holder having a heating element therein, and a squeegee or strip of rubber which is provided with grooves adapted to collect moisture and deliver the moisture into contact with the heating element to cause the generation of steam vapor thereby preventing freezing when the cleaner is in operation.

Other very important objects of the invention resides in the provision of a cleaner of this nature wherein the squeegee will readily rid itself of the moisture when the heating element is inoperative.

A still further very important object of the invention resides in the provision of a windshield cleaner of this nature which is simple in its construction, inexpensive to manufacture, strong and durable, convenient and compact, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a sectional view showing an embodiment of the windshield cleaner in association with a windshield, Figure 2 is a longitudinal section through the heating element, Figure 3 is an edge view of the wiper, Figure 4 is a side view of the squeegee, Figure 5 is a transverse section through the wiper, and Figure 6 is an enlarged detail transverse section through the wiper showing particularly the construction of the squeegee.

Referring to the drawings in detail it will be seen that the numeral 5 denotes an operating arm which may be actuated manually, by an electrical mechanism, by a vacuum motor, or in any other suitable, preferred or conventional manner. In the present illustration, by way of example, I have shown a shaft 6 journaled through the windshield and actuatable by a crank 7 for the operation of the arm 5. A clamp 8 of any preferred or conventional construction is mounted on the end of the arm 5 for grasping the holder 9 which includes a longitudinally split cylindrical portion forming a casing from the edges of the split of which projects in spaced parallelism flanges $b$ the edges of which have inwardly directed lips $c$. An electrical heating element E is insertable in the split cylindrical portion $a$ of the holder 9. This electrical heating element E comprises a cylindrical casing 10 closed at one end as is indicated at 11 and having the diameter of its other end enlarged as is indicated at 12 to provide a shoulder 13 restable on the upper edge of the casing portion $a$ of the holder 9 as is clearly indicated in Figure 1.

An electric conductor 14 extends through the casing 10 being embedded in suitable insulating material 15 so as to provide resistance to create heat when a current is in the circuit of the conductor 14 as is well known to those skilled in the art.

A squeegee 16 is formed by an elongated strip of rubber preferably flexible the major portion of which is disposed between the flanges $b$ and one longitudinal edge of which is reduced to provide a windshield engaging rib 17 and shoulders 18 for abutting the lip $c$ so that the squeegee will be retained in place against a heat conducting strip 19 adjacent the heating element E. The sides of the squeegee are formed with diagonal channels 20 which are arranged in pairs, the channels of each pair diverging away from each other toward the outer edge of teh squeegee and the inner ends of the channel merge together, said inner ends being larger than the outer ends so as to afford greater freedom to the flow of water in these channels.

When the windshield wiper moves in the usual manner that is in an arc over the windshield it will be seen that on the upward movement water will flow down the upper channel 20 of the pairs of channels and engage with the strip 19 so that if the conductor 14 in the heating element is energized the heat thus generated will transform the water into steam which will be emitted to prevent freezing on the windshield and also to melt any moisture which may have become frozen thereon. In case there is no danger of freezing owing to moderate temperature, and the heating element is de-energized, the water which enters through the upper channels of the pairs of channels will immediately flow out through the lower channels as will be quite apparent.

From the above detailed description it will be seen that I have devised an exceedingly simple and efficient windshield wiper effective in all kinds of weather and wherein the parts are capable of easy assembly and disassembly, may be cheaply manufactured with practical durability and strength and is thoroughly reliable for the purpose of preventing the detrimental freezing on the windshield at low temperature.

It is thought that the construction, utility and advantages of the invention will now be quite apparent to those skilled in this art without a more detailed description thereof. The present embodiment of the invention has been disclosed in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a windshield cleaner, a wiping member comprising a holder, a heating element in the holder, a squeegee in the holder, the sides of said squeegee being provided with channels through which water from the windshield may pass to contact with the heating element to produce steam vapor.

2. In a windshield cleaner, a wiping member comprising a holder, a heating element in the holder, a squeegee in the holder, the sides of said squeegee being provided with channels, said channels being arranged in pairs diverging inwardly to each other and merging together at their inner ends, so as to permit water from the windshield to enter the downwardly disposed channel and to contact with the heating element to produce steam vapor, which escapes to contact with the windshield through the upwardly disposed channel.

3. In a windshield cleaner, a wiping member comprising a holder, a heating element in the holder, a squeegee in the holder, the sides of said squeegee being provided with channels, said channels being arranged in pairs diverging inwardly to each other and merging together at their inner ends, said channels tapering outwardly in width, so as to permit water from the windshield to enter the downwardly disposed channel and to contact with the heating element to produce steam vapor, which escapes to contact with the windshield through the upwardly disposed channel.

In testimony whereof I affix my signature.

JOSEPH LONDINO.